A. ROOS.
STALK CUTTER.
APPLICATION FILED MAR. 13, 1917.
1,251,824.
Patented Jan. 1, 1918.
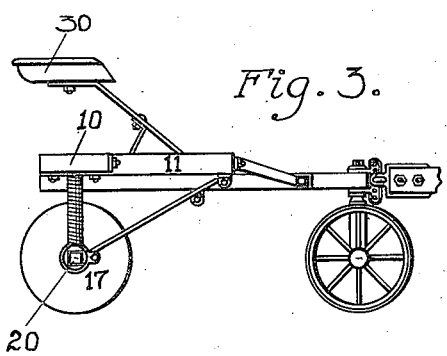
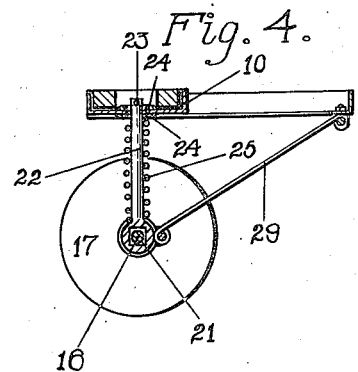
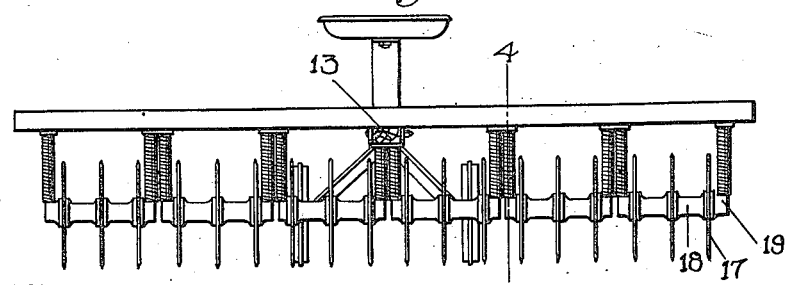
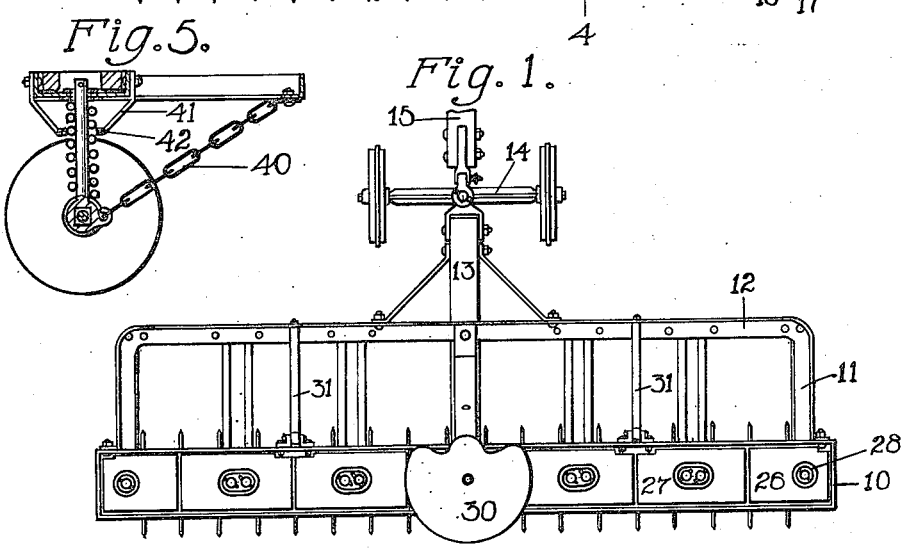
Witness.
Hal H Hyland.
Inventor.
Arie Roos.
By Onvig & Bair. Attys.

UNITED STATES PATENT OFFICE.

ARIE ROOS, OF NEWTON, IOWA.

STALK-CUTTER.

1,251,824.   Specification of Letters Patent.   Patented Jan. 1, 1918.

Application filed March 13, 1917. Serial No. 154,616.

*To all whom it may concern:*

Be it known that I, ARIE ROOS, a subject of the Queen of the Netherlands, and resident of Newton, in the county of Jasper and State of Iowa, have invented a certain new and useful Stalk-Cutter, of which the following is a specification.

The object of my invention is to provide a stalk cutter of simple, durable and inexpensive construction.

A further object is to provide a stalk cutter having a frame with a plurality of series of disks arranged on sectional shafts or axles, said axles being yieldingly mounted at each end, so that the various series of disks may move upwardly and downwardly independently of each other with relation to the frame for adjusting themselves to inequalities in the surface of the ground.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a stalk cutter embodying my invention.

Fig. 2 shows a rear elevation of the same.

Fig. 3 shows a side elevation of my improved stalk cutter.

Fig. 4 shows a vertical, sectional view taken on the line 4—4 of Fig. 2.

Fig. 5 shows a view similar to that of Fig. 4, of a slightly different form of my device.

In the accompanying drawings, I have used the reference numeral 10 to indicate generally a long shallow box forming part of the frame of my improved stalk cutter.

Extending forwardly from the ends of the box 10 are longitudinal frame members 11, which are connected at their forward ends by a transverse frame member 12.

Extending forwardly from the central portion of the transverse frame member 12 is a short tongue 13, supported at its forward end by a tongue truck 14, pivotally connected with which is the main tongue 15, which can swing upwardly and downwardly with relation to the truck, but which is arranged to turn the truck laterally with said main tongue.

Arranged below the box 10 are a plurality of short shafts 16 arranged in successive alinement with each other. Mounted on each shaft 16 is a series of flat sharp edged disks 17, which are spaced apart by sleeves 18. The end disks of each series have hubs 19. The axles 16 each have at one end a bolt head 20, and at the other end a nut 21. Extending upwardly from each hub 19 is a rod 22, the upper end of which extends slidably through an opening in the box 10.

Extended through the upper end of each rod 22 is a pin 23. Secured to the box 10 above and below each opening for the rods 22, are washers 24.

Mounted on each rod 22 between its hub 19 and the lower washer 24, through which the rod slides, is a strong coil spring 25.

I provide specially made weights 26 and 27 to be placed in the box 10 for putting as much weight as may be desired on the machine. These weights are provided with suitable openings 28, and allow the rod 22 to play up and down freely into or through the weights.

Each hub 19 is preferably pivoted to a brace 29, extending upwardly and forwardly and pivotally secured to the frame member 12. It may be noted in this connection that the openings through the bottom of the box 10 and through the washers 24 are large enough to allow proper play of the upright members 22.

A suitable seat 30 is provided on the machine, and the box 10 is connected with the frame member 12 by additional frame members 31.

It will be noted that the disks are arranged in a plurality of series, and that the axle of each series is capable of up and down movement with relation to the box 10, and that each end of each axle is capable of up and down movement with relation to the other end thereof, so that in cutting corn stalks or the like, where the ground may be arranged in ridges, the corn stalks will be reached and cut, however close they may lie to the ground.

In cross ridges or shallow spots, some of the sections of opposite series of disks may be considerably higher or lower than other sections, so that all of the corn stalks will be cut by the disk in crossing the field in one direction, and then crossed at right-angles to such first direction.

In Fig. 5 I have shown a slightly modified form of my device in which chains 40 are substituted for the braces 29. In the form shown in Fig. 5, I have shown braces 41 mounted on the box 10, and having collars 42 spaced below the box 10 for encircling the respective shafts 22 and the springs thereon.

Some changes may be made in the construction, and arrangement of the parts of my improved stalk cutter, and it is my intention to cover by my present application, any such modified forms of structure or use of mechanical equivalents, as may be reasonably included within the scope of my claims.

I claim as my invention:

1. A stalk cutter, comprising a frame including a receptacle, a transverse member spaced forwardly from said receptacle and secured thereto, a plurality of shafts arranged in alinement below said receptacle, a plurality of disks mounted on each shaft, means for connecting each end of each shaft with the forward transverse frame member, upright members operatively connected with each end of each shaft, and slidably extended through the bottom of said receptacle, and a strong coil spring on each upright member between its shaft and the receptacle, whereby the disk on each shaft may move up and down with relation to the disks on the other shafts, and whereby each end of each shaft may yieldingly move up and down with relation to the other end of the same shaft, and weights in said receptacle having openings to receive said upright members, whereby the weights are held in position and free play is permitted for the upright members.

2. A stalk cutter comprising a frame including a receptacle, transverse members spaced forwardly from said receptacle and secured thereto, a plurality of shafts arranged in alinement below said receptacle, a plurality of disks mounted on each shaft, means for connecting each end of each shaft with a transverse frame member, upright members operatively connected with each shaft, and slidably mounted on said receptacle, coil springs on each upright member between its shaft and the receptacle, a collar on each upright member, brace members extending upwardly and forwardly on each collar and secured to the frame, brace members extending rearwardly and upwardly on each collar and secured to the frame.

Des Moines, Iowa, January 26, 1917.

ARIE ROOS.